Aug. 29, W. V. SMITH 3,339,151

BEAM DEFLECTING LASERS

Original Filed Dec. 19, 1962

INVENTOR.
WILLIAM V. SMITH
BY
ATTORNEY

3,339,151
BEAM DEFLECTING LASERS
William V. Smith, Chappaqua, N.Y., assignor to International Business Machines Corporation, New York, N.Y., a corporation of New York
Continuation of application Ser. No. 245,702, Dec. 19, 1962. This application Jan. 12, 1966, Ser. No. 532,820
8 Claims. (Cl. 331—94.5)

This application is a continuation of copending application Ser. No. 245,702, filed Dec. 19, 1962, for lasers.

This invention relates to improved optical masers or lasers and, more particularly, to a device providing beam deflection and modulation of the output of an optical maser or laser.

The terms "optical maser" and "laser" are intended to be synonymous terms and are used to describe devices which by stimulated emission produce radiation in the infrared, visible or ultra-violet portions of the electromagnetic wave spectrum. The word "maser" is an acronym for microwave amplification by stimulated emission of radiation. When similar techniques are employed to produce waves within the optical region of the electromagnetic wave spectrum, the terms optical maser and laser are used, "laser" being an acronym for light amplifications by stimulated emission of radiation. Optical devices of this type are capable of producing radiation which is highly directional, coherent and monochromatic.

In recent years, a large amount of research and development work has been expended in attempting to develop masers and lasers as indicated by the following patents and publications:

U.S. Patents 2,836,722, "Atomic or Molecular Oscillator Circuit," and 2,929,922, "Masers and Maser Communications System."

Physical Review, vol. 112 page 1940, December 1958, "Infared and Optical Masers."

Nature, vol. 187, page 493, August 1960, "Stimulated Optical Radiation in Ruby."

This invention is particularly directed to a type of laser usually referred to as a Fabry-Perot laser. In a Fabry-Perot laser, the laser cavity usually includes two parallel reflecting plates separated by a small distance and enclosing a medium, capable of optical amplification. When supplied with a suitable source of pumping power, the medium enclosed within the laser emits radiation in one or more modes. Such a laser will emit radiation at all wave lengths, or modes, which are integrally related to the product of the index of refraction of the medium between the plates and the distance between the reflecting surfaces.

Recently, it has been found that a laser cavity having greater mode discrimination can be constructed by replacing one of the reflectors of the cavity described above with a two-plate reflector. In such a device, a second, external, Fabry-Perot cavity is connected in series with the cavity which receives the pumping power. One reflecting surface of each of the cavities forms a common interface between the two cavities. Greater mode discrimination is obtained by virtue of the fact that the frequency at which phase coherence is maintained in the amplifying medium must also be a frequency for which the reflectivity of the two-plate reflector is high.

In such a laser, it is desirable to provide means to modulate or deflect the beam output of the laser.

Accordingly, it is an important object of the present invention to provide an improved optical laser of the type providing modulation or beam deflection of the laser output.

It is a further object of the present invention to provide an improved laser of the type including an external cavity of an electro-optical medium, the index of refraction of which can be varied in order to selectively vary the emission of the primary laser cavity.

It is a further object of the present invention to provide an improved optical laser having an external cavity including a plurality of sub-cavities of electro-optical material, the index of refraction of which can be varied to selectively vary the stimulated emission in the primary laser cavity.

In accordance with one embodiment of the invention, a Fabry-Perot cavity is provided having two opposed reflecting surfaces enclosing an amplifying medium. A second, external, cavity is connected in series with the primary cavity. A reflecting surface of the primary cavity and a reflecting surface of the external cavity form a common interface between the two cavities. The external cavity is constructed of an electro-optical material, the index of refraction of which can be varied by the application of an external electric field. This external cavity is divided into a plurality of contiguous rectangular parallelepipeds. Each of these parallelepipeds is a sub-cavity containing an electrode passing through the longitudinal axis. The contact surfaces between these parallel sub-cavities and the entire longitudinal surface of the external cavity is electroded and held at ground potential. By selectively applying a suitable potential to each of the electrodes, it is possible to vary the index of refraction of each of the sub-cavities. The resulting inhomogeneity of index of refraction bends or disperses the laser radiations, thereby changing the reinforcement conditions sufficiently to quench the oscillations and to destroy the laser radiation in the primary cavity.

The foregoing and other objects, features, and advantages of this invention will be better understood from the following more detailed description and appended claims taken in conjunction with the drawings, in which:

Figure 1:
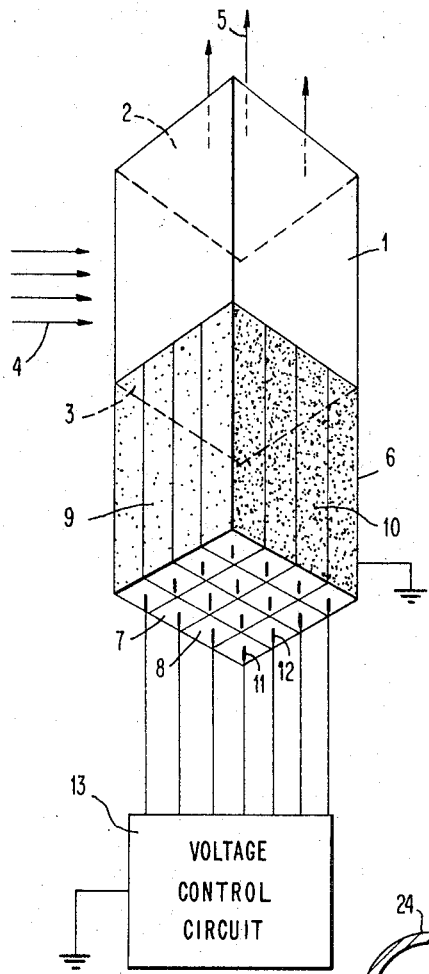
FIG. 1 shows a representation of the present invention.

Referring to FIG. 1, the laser includes a primary resonating cavity 1 having a partially reflective and partially transmitting surface at 2 and a reflecting surface 3. The reflectivity of surface 3 is less than the reflectivity of surface 2. The primary laser is supplied with pumping radiation as indicated at 4 which stimulates emission to produce the coherent output at 5. The cavity 1 includes an active medium which may be made of calcium fluoride doped with trivalent uranium, aluminum oxide doped with chromium or calcium tungstate doped with neodymium.

Includes in series with the primary cavity 1 is an external cavity 6. The surface 3 forms a common interface between the cavity 1 and the cavity 6. The bottom surface of cavity 6 is a mirror forming one of the reflective surfaces of the cavity as is well known in the art. The reflectivities of all the reflective surfaces used in the invention form no part of the present invention, such reflectivities being well known and easily determinable by the requirement that the mirror losses not exceed the gain in the active medium.

The external cavity 6 is divided into a plurality of sub-cavities such as those indicated at 7 and 8. Each of the subcavities is a parallelepiped. The contact surfaces between each of the parallel sub-cavities and the entire longitudinal surface, such as at 9 and 10, is electroded and connected to ground potential. Passing through the longitudinal axis of each sub-cavity is a wire electrode such as the electrodes 11 and 12. Each of these wire electrodes may be held at a different voltage. The control voltage source 13 is provided for this purpose. The source 13 applies a desired potential to each of the electrodes.

The external cavity 6 is constructed of an electro-optical material having the property that the index of refraction varies in accordance with the applied electric field. One example of an electro-optical material suitable for use in this invention is KDP.

The operation of the laser of the present invention is as follows: If a voltage is applied to all of the electrodes in each of the sub-cavities, the optical qualities of the external cavity are so impaired that the laser does not oscillate. If one or more of these center electrodes are grounded, there is no electro-optic deflection in that particular sub-cavity and a portion of the primary cavity 1 will oscillate. The oscillating part can be switched by grounding the desired center electrode.

The reason for the above-noted impairment is believed to be the following: When an electrical potential is applied to a central electrode, such as 11 or 12, the electrical field inside its associated sub-cavity 7, 8, etc., is strongest near the center of such electrode and weakens as the distance from the center of the electrode 11, 12, etc., increases. This latter condition results in a non-uniform index of refraction. The axial rays in cavity 1 that are incident to the sub-cavity through surface 3 strike the later with a plane phase front. As light waves enter the cavity 6, there occurs a slight change in the individual wave length, Δλ, of such entering axial rays. Since, for any given sub-cavity 7, 8, etc., to which a potential has been applied, there will be present in such sub-cavity a non-uniform index of refraction, so Δλ will be different for the several axial rays which form the phase front. Consequently, the phase front of the initially plane wave becomes bent, thereby destroying the reinforcement conditions necessary to sustain oscillation.

Figure 1A:
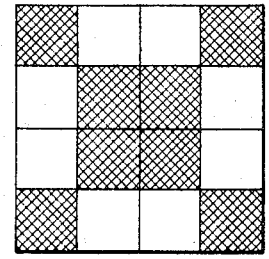
FIG. 1a shows and end view of the laser at the surface 2.

FIG. 1a shows the surface 2 of the laser through which the coherent monochromatic output light 5 passes. By selectively energizing certain ones of the electrodes in the sub-cavities, the laser emits light which may define a desired character. As shown in FIG. 1a, the laser is emitting light representing an X.

Figure 2:
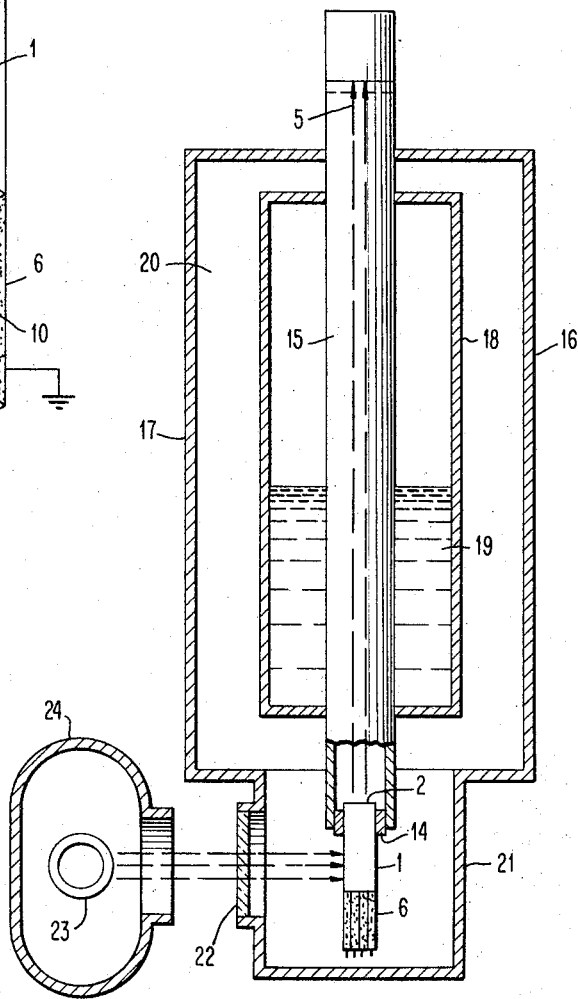
FIG. 2 shows a practical embodiment of the laser of the present invention.

FIG. 2 is a diagrammatic representation of one embodiment of an optical laser constructed in accordance with the principles of the present invention and operated at extremely low temperatures. In this figure, reference numerals corresponding to those used in FIG. 1 are used to identify like components. The device includes the active cavity 1 and the external cavity 6. The output of the laser is indicated at 5. The primary cavity and the external cavity are secured in a mounting 14 located in the lower end of a long cylindrical tube 15. This tube 15 is disposed in a Dewar vessel 16 having an outer container 17 and an inner container 18 which is partially filled with, for example, liquid nitrogen 19. A vacuum is maintained in the space 20 between the outer container 17 and the inner container 18. The mounting 14 for the cavities 1 and 6 is positioned in the lower end of the long cylindrical tube 15 so that the surface 2 of the cavity 1 through which approximately 1.5 percent of the incident light applied thereto is transmitted passes the coherent output light 5 through the long cylindrical tube 15. A vacuum is also maintained in the long cylindrical tube 15. Since the tube 15 passes through the liquid nitrogen 19 in the inner container 18, this tube 15 is essentially at 77° K. which is the boiling point for liquid nitrogen at atmospheric pressure. The KDP material in the cavity 1 may be heated within a few degrees of its Curie point by any known means, such as the use of a heating coil.

The outer container 17 has a chamber 21 at the lower end thereof into which the cylindrical tube 15 extends and in which the mounting 14 is disposed. The chamber 21 has a window or port 22 at one side thereof. A pumping light source 23 is surrounded by a light shield 24 so as to direct the pumping light through the window 22 of the chamber 21 to the outer surface of the cavity 1. The pumping light source 23 may be of any suitable type providing either pulsed or continuous radiation, as desired.

Examples of modifications of the laser of the present invention, which are not to be considered as limiting, are as follows: While the output light 5 has been shown as passing through the upper surface 2 of the primary cavity, the output light may also pass through the lower end of the external cavity. In this case, the surface at the lower end of the external cavity 6 should be partially reflecting and partially transmitting, surface 2 being a totally reflecting surface.

Although the laser has been shown as having a center reflecting interface 3, this surface 3 need not be provided. The laser may be constructed with only two mirrors or reflecting surfaces.

The laser of this invention has been shown in a practical embodiment as being of the low temperature type. This invention may also be used in conjunction with a gas laser. If the invention is used with a gas laser, it is possible to use barium titanate as the electro-optical material for the external cavity 6. Barium titanate may be used only in embodiments where the temperature is maintained a few degrees above the Curie point of barium titanate, which is approximately 120° C.

While specific embodiments of the invention have been shown and described, it will, of course, be understood that various changes may be made without departing from the principles of the invention. The appended claims are, therefore, intended to cover any such modifications within the true spirit and the scope of the invention.

What is claimed is:
1. A laser comprising an active element,
   means for applying pumping radiation to said active element,
   an external cavity connected in series with said active element,
   and electrical means connected to said external cavity for selectively destroying reinforcement conditions necessary for oscillation in portions of said laser.
2. A laser comprising an active element,
   means for applying pumping radiation to said active element,
   an external electro-optical cavity, said external cavity being connected in series with said active element,
   and electrical means connected to said external cavity for causing selected portions of said external cavity to exhibit a non-uniform index of refraction to destroy reinforcement conditions in portions of said laser.
3. The laser recited in claim 2 wherein the means for causing selected portions of said external cavity to exhibit a non-uniform index of refraction includes means for selectively applying an electric field to said electro-optical material.
4. In a laser of the type including a first Fabry-Perot cavity having at least two reflective surfaces, an active medium, and a source of pumping radiation,
   the improvement comprising an external Fabry-Perot cavity, said external cavity being constructed of electro-optical material,
   said external cavity having at least one reflective surface forming a common interface with one reflective surface of said first Fabry-Perot cavity,
   and means for selectively causing portions of said external cavity to exhibit a non-uniform index of refraction whereby light beams incident to said portions are dispersed therein.
5. The laser recited in claim 4 wherein said external cavity includes,
   a plurality of sub-cavities, each of said sub-cavities being a parallelepiped of electro-optical material,
   the surfaces of each of said sub-cavities being electroded,
   the surfaces of each of said sub-cavities being connected to a common potential,
   each of said sub-cavities containing a wire electrode passing through the longitudinal axis, and said last-mentioned means including means to selectively apply potentials to said wire electrodes.

6. A laser comprising:
a resonant cavity;
an active element disposed within said cavity;
means for exciting said active element to produce coherent oscillations within said cavity;
structural means having a plurality of discrete side by side regions, each region being in series with said active element and in said cavity, means coupled to each region for altering the effective optical path of said cavity including such region when actuating energy is applied thereto; and
means for applying actuating energy to selected regions of said structural means to produce such changes in effective optical paths to thereby alter cavity reinforcement conditions necessary for producing said coherent oscillations in such selected regions.

7. A laser comprising:
a resonant cavity;
an active element disposed within said cavity;
means for exciting said active element to produce coherent oscillations within said cavity;
a plurality of discrete side by side electro-optical regions, each of which is in series with said active element and is disposed in said cavity, means coupled to each region for changing its index of refraction when actuating energy is applied thereto; and
means for applying actuating energy to selected electro-optical regions for effecting changes in the index of refraction of such regions to alter cavity reinforcement conditions necessary for producing said coherent oscillations in such selected regions.

8. A laser as defined in claim 7 wherein said actuating energy is applied to said electro-optical regions to produce inhomogeneous changes in the index of refraction of the selected regions.

References Cited

UNITED STATES PATENTS 3,242,439    3/1966    Rigden et al. _____ 331—94.5
3,243,722    3/1966    Billings _____ 331—94.5

JEWELL H. PEDERSEN, *Primary Examiner.*

RONALD L. WIBERT, *Examiner.*